United States Patent [19]

Christensen et al.

[11] 4,131,760

[45] Dec. 26, 1978

[54] MULTIPLE MICROPHONE DEREVERBERATION SYSTEM

[75] Inventors: Susan W. Christensen, Tuxedo Park, N.Y.; Cecil H. Coker, Chatham, N.J.

[73] Assignee: Bell Telephone Laboratories, Incorporated, Murray Hill, N.J.

[21] Appl. No.: 858,418

[22] Filed: Dec. 7, 1977

[51] Int. Cl.[2] .............................................. H04B 15/00

[52] U.S. Cl. ................................ 179/1 P; 179/1 HF; 179/1 CN

[58] Field of Search .................. 179/1 P, 1 HF, 1 SC, 179/81 B, 100 L, 1 CN, 1 J; 181/125

[56] References Cited

U.S. PATENT DOCUMENTS

| | | | |
|---|---|---|---|
| 3,057,960 | 10/1962 | Kaiser ................................. | 179/1 P |
| 3,542,954 | 11/1970 | Flanagan ............................... | 179/1 J |
| 3,644,674 | 2/1977 | Mitchell ............................... | 179/1 P |
| 3,794,766 | 2/1974 | Cox et al. ............................. | 179/1 P |

*Primary Examiner*—Kathleen H. Claffy
*Assistant Examiner*—E. S. Kemeny
*Attorney, Agent, or Firm*—J. S. Cubert

[57] ABSTRACT

A circuit for reducing reverberative interference utilizes a pair of spatially separated microphones to obtain speech signals from a common sound source. Each speech signal is transformed into an envelope representative signal having rapid increases responsive to direct path and echo energy bursts from the sound source and exponential decaying portions between energy bursts. A first pulse corresponding to a sound source direct path energy burst is generated responsive to the first speech signal exceeding its envelope representative signal, and further first pulses corresponding to echo bursts are inhibited for a predetermined time. A second pulse corresponding to said sound source direct path energy burst is generated responsive to the second speech signal exceeding its envelope representative signal, and further second pulses corresponding to echo bursts are inhibited for a predetermined time. The first and second speech signals are aligned in phase responsive to the time difference between said first and second pulses. Three embodiments are disclosed: phase alignment by electronic delay adjustment using a pair of microphones or using vertical arrays of microphones, and phase alignment by feedback servo control of a rotatable microphone array.

22 Claims, 9 Drawing Figures

MULTIPLE MICROPHONE DEREVERBERATION SYSTEM

BACKGROUND OF THE INVENTION

Our invention relates to audio communication and more particularly, to arrangements for reducing reverberation and echo effects in audio systems.

In telephone and other audio communication systems, sound applied to an electroacoustic transducer from a single source often traverses a plurality of diverse paths between the source and the transducer. In addition to the direct path signal, delayed echo signals are obtained as a result of reflections from walls and other surfaces. The echoes are delayed with respect to the direct path signals and do not add in phase with the direct path signal. Consequently, the combination of direct path and echo signals causes distortion. If the position of the sound source is known, it is possible to place a transducer near the source so that inverse square law attenuation reduces the echo signals. Alternatively, a highly directional microphone aimed at the source can be used to enhance the direct path signal with respect to echo signals.

There are many systems, however, in which the direction of the sound source is variable or unpredictable. In conferencing arrangements, for example, a plurality of speakers in a room are served by a speakerphone set. The direction of sound is variable and the room reflections are generally not controlled. Consequently, adverse effects are distinctly noticeable and some electronic arrangement must be used to reduce echo and reverberation without changing room conditions.

One type prior art system for reducing multipath reverberative interference utilizes two or more spatially separated microphones, each receiving different versions of the same sound. The microphone outputs are directly combined so that reverberative effects are minimized. In another arrangement, the signals from a plurality of spatially separated microphones are processed to select the signal having least reverberative interference. These arrangements, however, require that one microphone be substantially closer to the sound source that the other microphones of the system. Other techniques use spectral analysis to select spectral portions of each of a plurality of microphone signals. The selected spectral portions are combined to produce a composite signal with reduced reverberation. The spectral techniques, however, employ relatively complex apparatus to partially reduce the echo effects.

A more direct solution to the reverberative interference problem is disclosed in U.S. Pat. No. 3,794,766 issued on Feb. 26, 1974 and assigned to the same assignee. In accordance with this patent, sound from a source is received by a pair of spatially separated microphones. Each microphone signal is passed through a delay and the delayed signals are cross-correlated in the time domain. The cross-correlation signal is used to control one delay, which delay is adjusted to maximize the cross-correlation signal. The delayed direct path signals are now aligned in phase, but the reverberation signals remain out of phase. The summing of the delayed signals produces an output signal with reduced reverberation.

The delayed microphone signals include complex direct path and echo signals. The echo signals are substantial replicas of the direct path signals and are therefore closely correlated with the direct path signals. Thus, the direct cross-correlation results in a composite of many peaks including peaks corresponding to delays between different echo signals and peaks corresponding to delays between echo signals and direct path signals as well as peaks for the direct path signals. Further, the correlations of speech signals do not generally produce sharp peaks. Unless the direct path signals are much stronger than the echo signals, the correlation signal which is a composite of many broad peaks may not be maximum when the direct path components of the delayed signals are coincident. Consequently, the reduction of reverberative effects is relatively poor without complex multiple cross-correlation arrangements.

It has been observed that the delay between microphone signals obtained from a single source can be better detected if the complex detailed waveforms of the delayed signals are changed by non-linear transformation. By transforming the delayed signals to reduce waveform detail, the direct path components are enhanced with respect to the echo components and the effect of signal similarity on the location of correlation peaks is reduced. It is therefore an object of the invention to provide an improved, simplified signal dereverberative arrangement which is not affected by the complex detailed nature of the audio signal.

SUMMARY OF THE INVENTION

The invention is directed to a circuit for reducing reverberative interference in which first and second audio signals are obtained from a sound source through spatially separated transducers. Responsive to said first audio signal, a first pulse corresponding to an energy burst in said sound source is produced and further first signal pulses are inhibited for a predetermined time following said generated first pulse. Responsive to said second audio signal, a second pulse corresponding to said sound source energy burst is produced and further second pulses are inhibited for a predetermined time following said generated second pulse. Jointly responsive to said first and second pulses, the first and second audio signals are phase aligned.

According to one aspect of the invention, the first audio signal is delayed by a fixed time period and the second audio signal for a time period corresponding to the time difference between said first and second pulses. In this way, The relative delay of said first and second audio signals is altered to align said delayed first and second signals. The aligned first and second signals are summed to produce an output signal with reduced reverberative interference.

According to another aspect of the invention, the spatially separated transducers are mounted on a platform together with a unidirectional transducer and a signal representative of the time difference between said first and second pulses is formed. The platform is reoriented until the time difference representative signal is minimized whereby the unidirectional transducer receives the direct path signal.

According to yet another aspect of the invention, the time difference representative signal is generated by transforming each audio signal into an envelope representative signal characterized by a rapid increase responsive to an energy burst in the audio signal and slow exponential decays between energy bursts. The audio signal is compared to said envelope representative signal and an energy burst corresponding pulse is generated when the audio signal exceeds the envelope representative signal. A logic array compares the time of occurrence of selected first pulses with the time of occurrence of selected second pulses and produces a time difference representative signal.

According to yet another aspect of the invention, each transducer comprises a plurality of microphones arranged in a vertical column. The outputs of the microphones in each vertical column are summed to form an audio signal.

DETAILED DESCRIPTION

Figure 1:
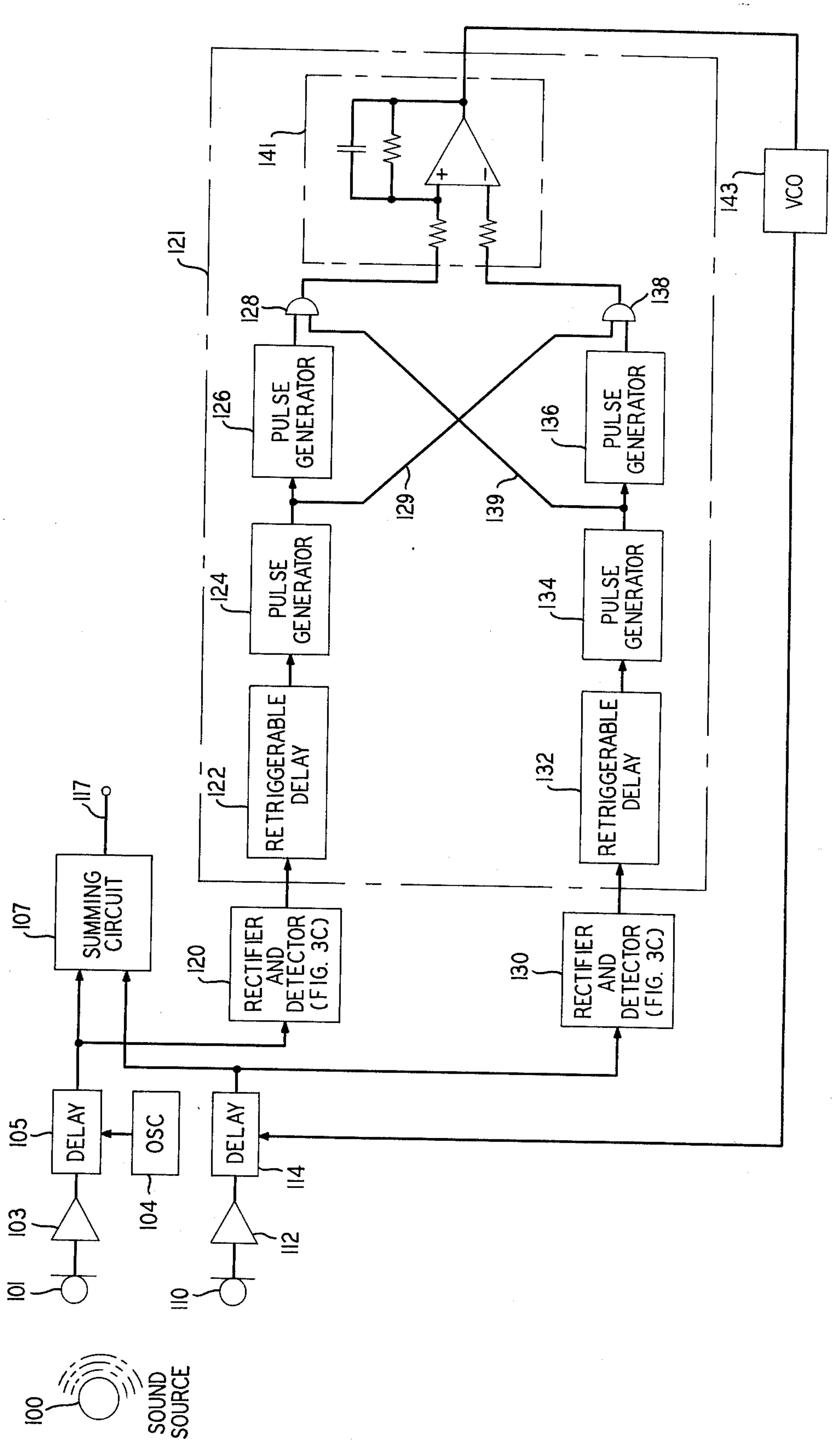
FIG. 1 depicts a block diagram of a signal dereverberation circuit illustrative of the invention.
Figure 5:
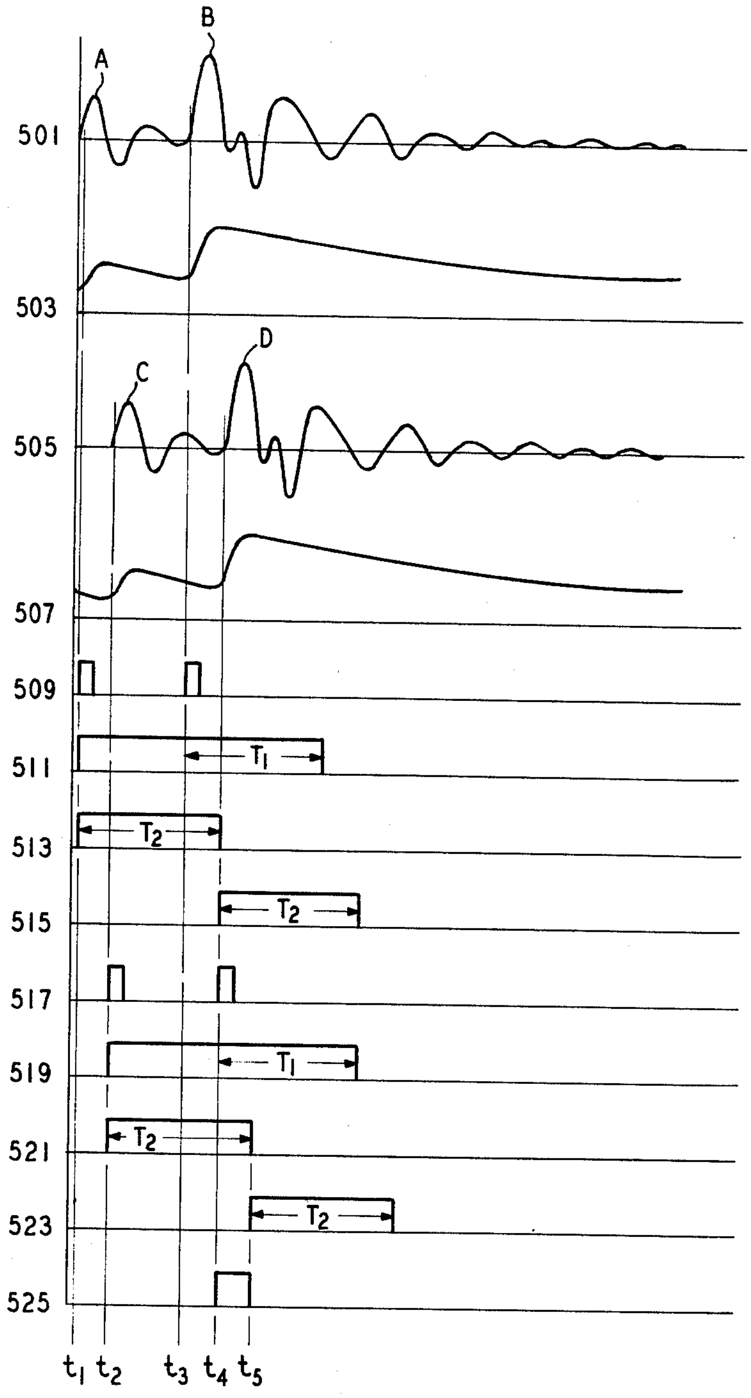
FIG. 5 shows waveforms which illustrate the operation of the signal dereverberation circuit of FIG. 1.

Referring to FIG. 1, microphones 101 and 110 are spatially separated and each microphone converts the acoustic waves incident thereon to an audio signal. The acoustic wave includes a direct path component as well as echo and reverberation components. The audio signal from microphone 101 is amplified by preamplifier 103 and applied to fixed delay 105 whose delay characteristic is controlled by fixed frequency oscillator 104. The delayed signal from fixed delay 105 shown in waveform 501 of FIG. 5 is applied to summing circuit 107 and to rectifier and detector 120. Similarly, the audio signal from microphone 110 is amplified in preamplifier 112 and delayed by adjustable delay 114, which delay characteristic is controlled by voltage controlled oscillator 143. The output of variable delay 114 shown in waveform 505 of FIG. 5 is applied to summing circuit 107 and is also applied to rectifier and detector 130. The delay of adjustable delay 114 is varied responsive to the operation of logic circuit 121 so that the inputs to summing circuit 107 may be phase aligned. In this manner the output from summing circuit 107 provides a signal which has reduced echo and reverberation distortion.

As shown in FIG. 5, waveform 505 obtained from delay 114 is substantially similar to waveform 501 obtained from delay 105. Waveform 505, however, is delayed with respect to waveform 501 due to the relative positions of microphones 101, 110 and sound source 100. Each of these waveforms is the result of acoustic waves received directly from sound source 100 and acoustic echoes and reverberations. Waveform 501 from delay 105 exhibits a direct path energy burst at point A and a strong echo at point B. Delayed waveform 505 from delay 114 includes a direct path energy burst at point C and a strong echo at point D. Because of the complex details of the audio signals shown in waveforms 501 and 505 and of the similarity between direct path and echo components, direct cross-correlation of the signals may not produce peak signals which accurately define the delay between the two direct path signals but may produce multiple peaks, no definitive peaks or false peaks.

In accordance with the invention, rectifier and detector circuit 120 is operative to generate a signal representative of the positive envelope of waveform 501 and to produce pulses coincident with the energy bursts in waveform 501. The envelope representative signal shown in waveform 503 is generated by rectification and nonlinear low pass filtering in rectifier and detector circuit 120. Circuit 120 provides a rapid response to each increase representative of an energy burst in the delayed audio signal of waveform 501 and a slow exponential decay between energy burst increases.

In rectifier and detector circuit 120, a pulse is generated each time a positive transition of waveform 501 exceeds the exponential decay of waveform 503. The generated pulses (waveform 509) are coincident with the energy bursts in waveform 501. In similar manner, rectifier and detector circuit 130 provides rectified and low-pass filtered waveform 507 and is operative to generate pulses (waveform 517) coincident with energy bursts in waveform 505, i.e., at each positive transition of waveform 505 that exceeds the exponential decay of waveform 507. Waveforms 503 and 507 eliminate the detailed audio information of waveforms 501 and 505 but retain the energy burst occurrence information contained therein.

Figure 3A:
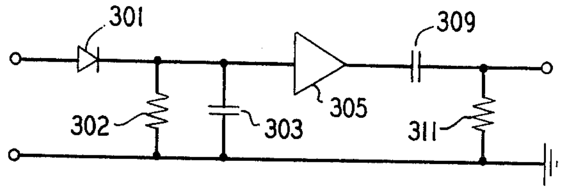
FIG. 3A shows a schematic diagram of a rectifier and detection circuit useful in the signal dereverberation circuits of FIGS. 1 and 2.

FIG. 3A shows one circuit for transforming a delayed microphone signal into energy burst coincident pulses. In FIG. 3A, an audio signal is supplied to the anode of rectifier diode 301. The cathode of diode 301 is connected to the parallel combination of resistor 302 and capacitor 303. This parallel combination forms an integrating circuit which provides a rapid rise responsive to a positive going signal on the anode of diode 301 which exceeds the voltage across capacitor 303 and a slow exponential decay when diode 301 is non-conductive. The junction of diode 301, resistor 302 and capacitor 303 is connected to the input of isolating amplifier 305 and the output of amplifier 305 is connected to the differentiating circuit comprising series connected capacitor 309 and resistor 311.

Figure 3B:
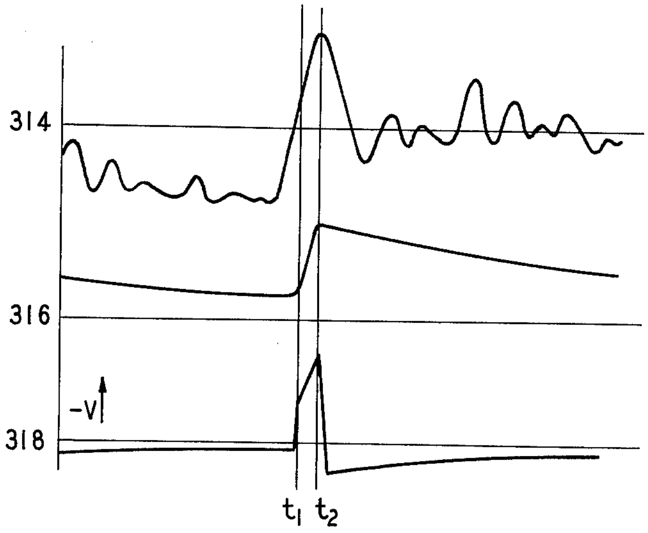
FIG. 3B shows waveforms which illustrate the operation of the circuit of FIG. 3A.

Waveform 314 of FIG. 3B illustrates a portion of an audio signal applied to the input of the circuit of FIG. 3A and waveform 316 illustrates the voltage across capacitor 303. Before time $t_1$ the voltage on capacitor 303 is more positive than input voltage of waveform 314. At time $t_1$ there is a rapid increase in the difference between signal shown in waveform 314 and the voltage on capacitor 303 whereby diode 301 conducts and the voltage on capacitor 303 is rapidly increased. After time $t_2$, diode 301 is rendered non-conductive because voltage waveform 314 is less than voltage waveform 316 and the voltage at the input to amplifier 305 decays exponentially at a rate determined by the values of capacitor 303 and resistor 302. These values are selected in accordance with the well known characteristics of speech signals. The output of amplifier 305 is substantially similar to waveform 316. Responsive to the output of amplifier 305, the differentiating network comprising capacitor 309 and resistor 311 produces the pulse shown in waveform 318 between times $t_1$ and $t_2$. The pulse appearing at the junction of capacitor 309 and resistor 311 is coincident with the energy burst in wave form 314.

Figure 3C:
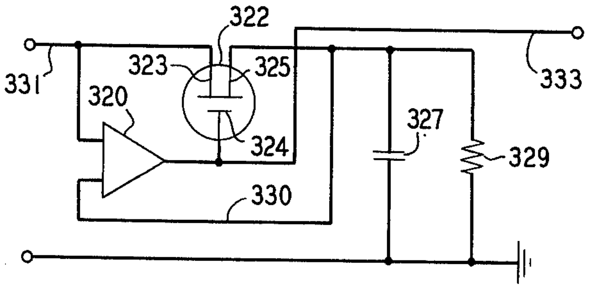
FIG. 3C shows a detailed schematic diagram of another rectifier and detection arrangement useful in the signal dereverberation circuits of FIGS. 1 and 2.

FIG. 3C shows a rectifier and detector circuit which provides a better defined output pulse at the beginning of each energy burst in an audio signal applied thereto. In FIG. 3C, capacitor 327 and resistor 329 form an integrating circuit adapted to provide a rapid response to a positive going input and a slow exponential decay. The voltage across capacitor 327 is applied to one input of comparator amplifier 320. The other input of amplifier 320 is connected to line 331 to which the input audio signal is applied. Comparator 320 provides a large positive voltage when the audio signal input on line 331 exceeds the voltage on lead 330 from capacitor 327. Field effect transistor (FET) 322 is operative to apply the input audio signal on line 331 to one side of capacitor 327 when the output of comparator 320 is sufficiently positive to cuase FET 322 to conduct. FET 322 disconnects line 331 from capacitor 327 at all other times.

Figure 3D:
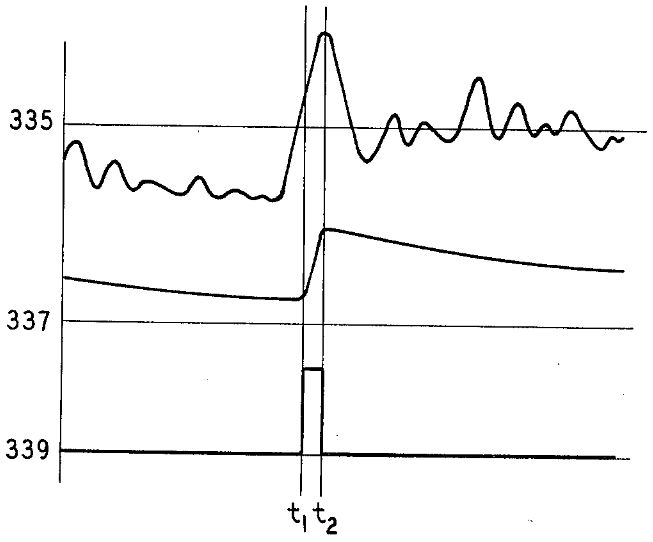
FIG. 3D shows waveforms which illustrate the operation of the circuit of FIG. 3C.

Assume, for purposes of illustration, that an audio signal represented by waveform 335 in FIG. 3D is applied to line 331 and that the voltage on capacitor 327 is decaying exponentially prior to time $t_1$ as shown in waveform 337. Just prior to time $t_1$, waveform 335 exceeds exponentially decaying waveform 337. The output of amplifier 320 shown in waveform 339 rapidly becomes positive. Responsive to the positive voltage applied to gate electrode 324, FET 322 is rendered conductive whereby line 331 is connected to capacitor 327 via source electrode 323, the conductive drain-source path of FET 322 and drain electrode 325. The voltage on capacitor 327 increases rapidly and the output of amplifier 320 remains positive between times $t_1$ and $t_2$ as shown in waveform 339.

At time $t_2$, the voltage on capacitor 327 (waveform 337) exceeds the audio signal voltage on line 331 (waveform 335). Comparator 339 reverses state and FET 322 is rendered non-conductive. After time $t_2$, the voltage on capacitor 327 decays exponentially at a rate chosen to prevent amplifier 320 from providing a positive output until the next energy burst in the input audio signal. In the circuits of FIGS. 3A and 3C, an input audio signal is transformed into a positive envelope representative signal that includes energy burst information but is devoid of the audio signal details and energy burst coincident pulses are generated.

The output of rectifier and detector circuit 120 is applied to retriggerable delay 122 and the output of rectifier and detector circuit 130 is applied to retriggerable delay 132. As shown in waveform 509 of FIG. 5, the output pulses from rectifier and detector circuit 120 occur at times $t_1$ and $t_3$ responsive to audio signal waveform 501 exceeding envelope representative waveform 503. These pulses at time $t_1$ and $t_3$ correspond to the direct path energy burst and echo energy burst at points A and B of waveform 501, respectively. Similarly, output pulses are obtained from rectifier and detector circuit 130 at times $t_2$ and $t_4$ responsive to audio signal waveform 505 exceeding exponential waveform 507. The output pulses from circuit 130 which correspond to the energy burst and echo at points C and D of waveform 505 are shown in waveform 517.

The audio waveform is generally a succession of energy bursts. Each direct path energy burst is closely followed by one or more echo enegy bursts and the next direct path energy burst is separated from the last echo burst by at least a predetermined time period. The output of retriggerable delay 122 becomes high at time $t_1$ responsive to a direct path energy burst and remains high for at least a predetermined period ($T_1$) as is well known in the art. An echo energy burst pulse applied to delay 122 at time $t_3$ causes the output of retriggerable delay 122 to remain high for said predetermined period ($T_1$). In this manner, a positive going transition can be obtained from retriggerable delay 122 only after a predetermined period ($T_1$) subsequent to the occurrence of the immediately preceding pulse applied to the retriggerable delay. Time period $T_1$ is adjusted so that direct path energy burst pulses are selected and echo pulses are inhibited. Generally, a time period of 3 milliseconds to 5 milliseconds is appropriate. Retriggerable delay 122 produces a positive transition corresponding to each direct path energy burst and is operative to inhibit positive transitions for a predetermined time after the occurrence of the last echo burst.

Responsive to the positive going transition of the output of retriggerable delay 122 at time $t_1$, the output of pulse generator 124 is switched high for a predetermined time ($T_2$) as shown in waveform 513. Pulse generator 124 is not responsive to any further outputs from rectifier and detector 120 until retriggerable delay 122 is reset. The negative transition at the output of pulse generator 124 at time $t_4$ causes pulse generator 126 to go high. The output of pulse generator 126 remains high for a predetermined time ($T_2$) as shown in waveform 515.

Responsive to the pulse output of circuit 130, retriggerable delay 132 switches high at time $t_2$ responsive to a direct path energy burst pulse and remains high for a predetermined period ($T_1$) after the occurrence of the echo burst pulse from circuit 130 at $t_4$ as shown in waveform 519. The output of pulse generator 134 (waveform 521) goes high and remains high for a predetermined period ($T_2$) responsive to the positive transition in the retriggerable delay 132 output at time $t_2$. Upon the occurrence of the negative transition in the output of pulse generator 134 at time $t_5$, the output of pulse generator 136 (waveform 523) becomes high for a predetermined period ($T_2$).

The outputs of pulse generators 126 and 134 are applied to AND gate 128 while the outputs of pulse generators 124 and 136 are applied to AND gate 138. Between times $t_4$ and $t_5$, the outputs of generators 126 and 134 (waveforms 515 and 521) are both high whereby gate 128 is opened and a pulse therefrom (waveform 525) is applied to the positive input of integrating amplifier 141. As is readily seen from FIG. 1, gate 128 is opened only when the signal at microphone 101 precedes the signal at microphone 110.

The signal obtained from gate 128 causes the output of amplifier 141 to increase in the positive sense. As is well known in the art, voltage controlled oscillator 143 is responsive to the increase in voltage on the output of amplifier 141 to decrease the delay time of delay 114. Consequently, the phase difference between the delayed signals applied to summing circuit 107 is reduced. In this way, the feedback arrangement including logic circuit 121 is operative to phase-align the audio signals applied to summing circuit 107 whereby the echo and reverberative effects are significantly reduced.

In the event that the audio signal from microphone 110 precedes the audio signal from microhone 101, gate 138 is opened and amplifier 141 produces a negative going output voltage. This negative voltage reduces the oscillation frequency of voltage control oscillator 143 so that the delay of delay 114 is increased and the phase difference between the signals applied to summing circuit 107 is reduced. Consequently, the audiosignals applied to summing circuit 107 are phase aligned. As is readily seen from FIG. 1, it is necessary to trigger both pulse generators 124 and 134 to obtain an output from one of gates 128 and 138. Thus, no adjustment of delay 114 is permitted responsive to a noise signal which produces an output from only one of rectifier and detector circuits 120 and 130.

Figure 4:
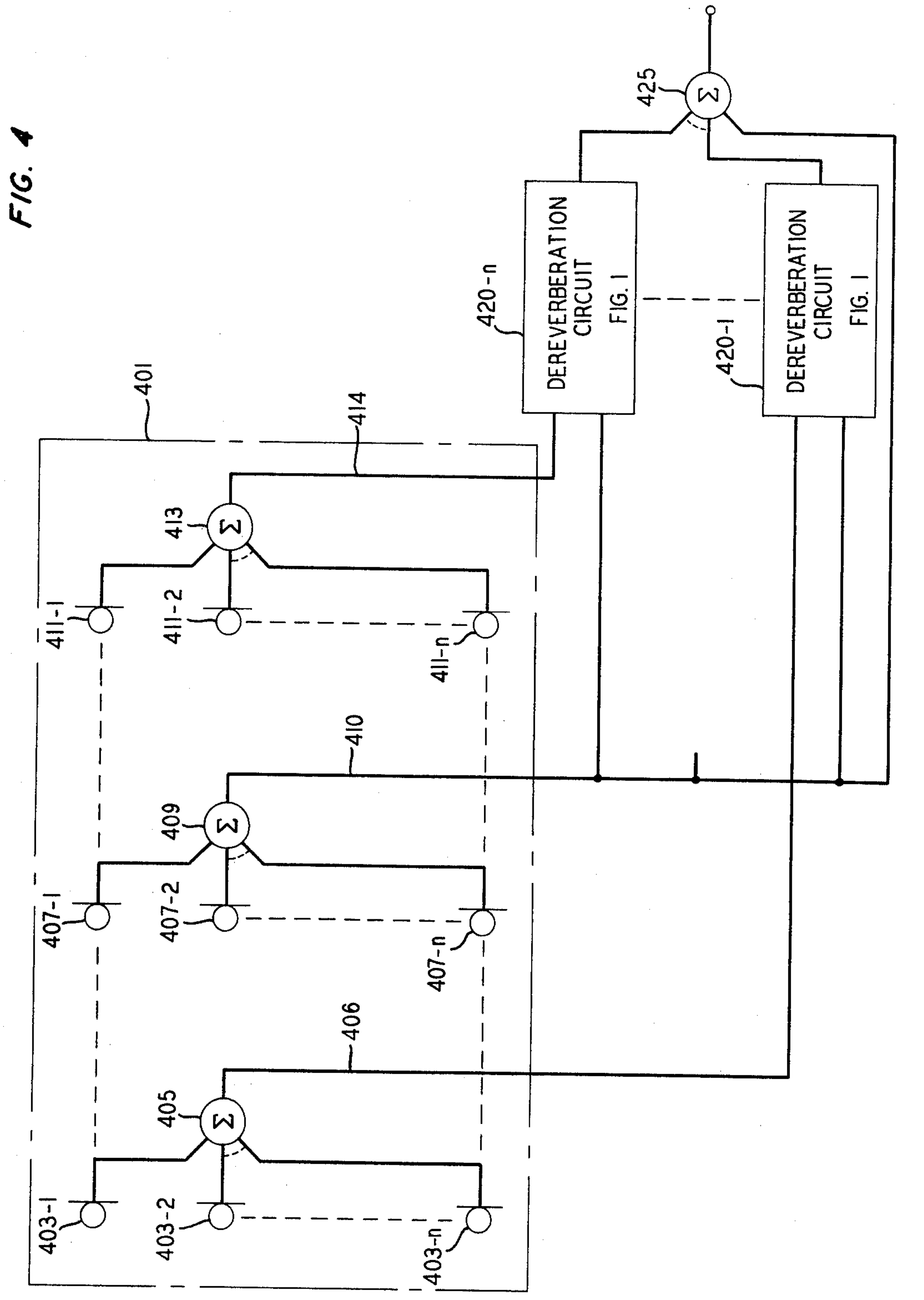
FIG. 4 shows a block diagram of a combination of signal dereverberation circuits in accordance with FIG. 1 useful in conferencing arrangements.

FIG. 4 shows how the dereverberation arrangements of FIG. 1 may be connected to a wall-mounted microphone array at a conference location. Microphone array 401 includes a plurality of vertical columns of microphones. Microphones 403-1 through 403-n form the left-most vertical column; microphones 411-1 through 411-n form the right-most vertical column; and microphones 407-1 through 407-n form the center vertical column. As indicated by the dashed lines, other vertical columns of microphones may be used.

The microphones of each vertical column are connected to a summing circuit. For example, the outputs of center column microphones 407-1 through 407-n are connected to summing circuit 409. The output of summing circuit 409 on line 410 is connected to the fixed delay input (delay 105) of each dereverberation circuit 420-1 through 420-n. The output of summing circuit405 on line 406 is connected to the adjustable delay input (delay 114) of dereverberation circuit 420-1 while the output of summing circuit 413 on line 414 is connected to the adjustable delay input (delay 114) of dereverberation circuit 420-n.

Each of the dereverberation circuits comprise the circuit of FIG. 1 except that the single microphone outputs shown in FIG. 1 are replaced by the summing circuit outputs of FIG. 4. Since the phase difference, between the microphones in any vertical column is relatively small, the outputs therefrom are summed directly. The phase differences between different columns, however, depend on the location of the sound source in the room. Delay adjustment of the different columns is necessary in order to phase align the array signals in the horizontal plane of the sound source.

As disclosed with respect to FIG. 1, dereverberation circuit 420-1 is operative to align the output of summing circuit 405 to the output of summing circuit 409 whereby the direct path signals of all microphones will add in phase, but echo signals from different directions will not be in phase. Similarly, dereverberation circuit 420-n is operative to phase align the output of summing circuit 413 to the output of summing circuit 409 to phase align the direct path components. The output of each dereverberation circuit is applied to summing circuit 425 which supplies the conference room output audio signal. As is readily observed, the output of each dereverberation circuit is aligned to the output of center column summing circuit 409 whereby the output of summing circuit 409 may be directly applied to summing circuit 425.

Figure 2:
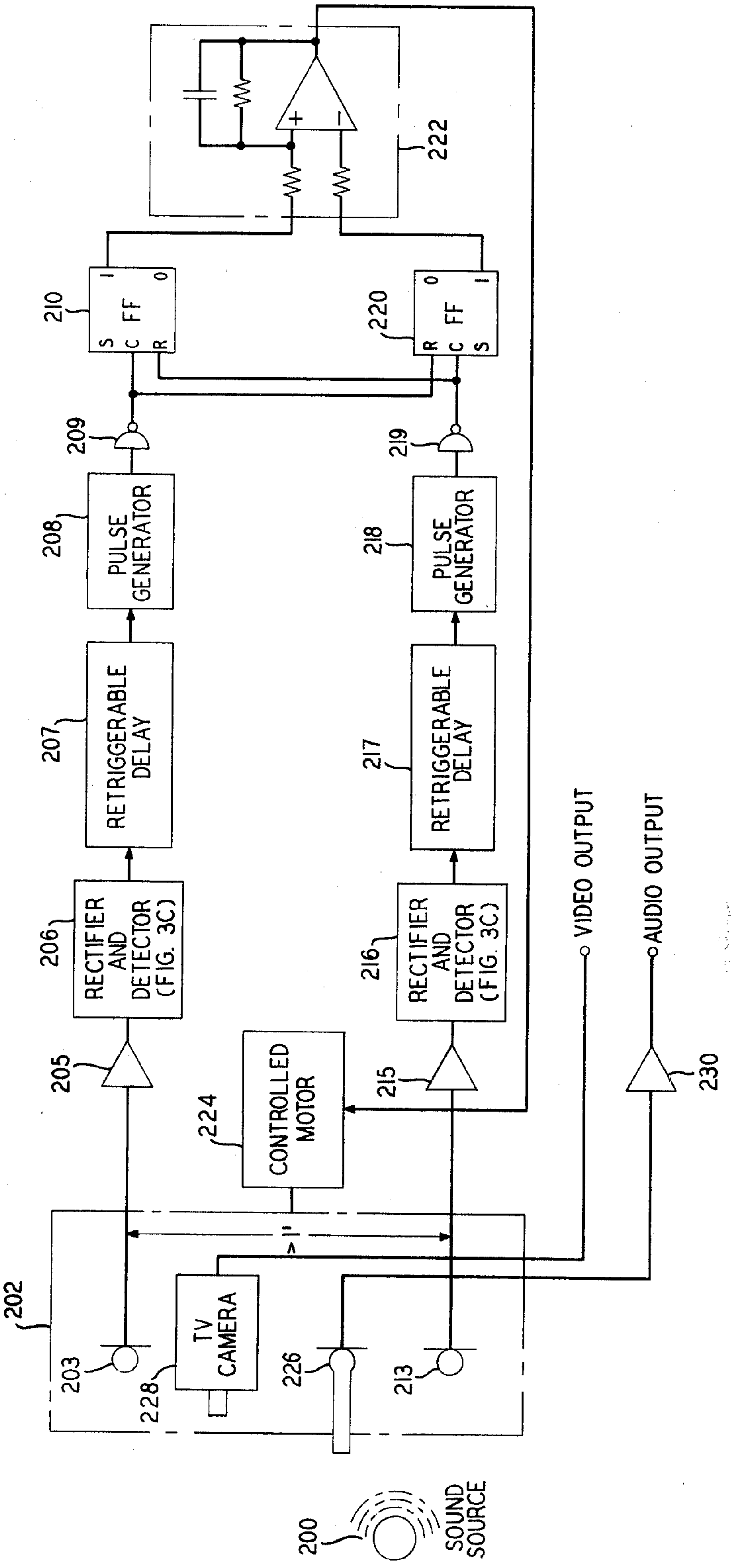
FIG. 2 depicts a block diagram of another signal dereverberation circuit illustrative of the invention.

FIG. 2 shows an alternative dereverberation circuit in accordance with the invention. In FIG. 2, microphones 203, 213 and 226 are mounted on rotatable platform 202 together with television camera 228. The position of platform 202 is determined by controlled motor 224. Microphone 226 is a unidirectional unit responsive only to acoustic waves arriving from substantially one direction. Microphones 203 and 213 are omnidirectional and are placed on opposite sides of microphone 226 equidistant therefrom. Acoustic waves from source 200 result in audio signals at the inputs of amplifiers 205 and 215. The audio signal from the output of amplifier 205 is applied to rectifier and detector 206 which may, for example, be the circuit shown in FIG. 3C.

Figure 6:
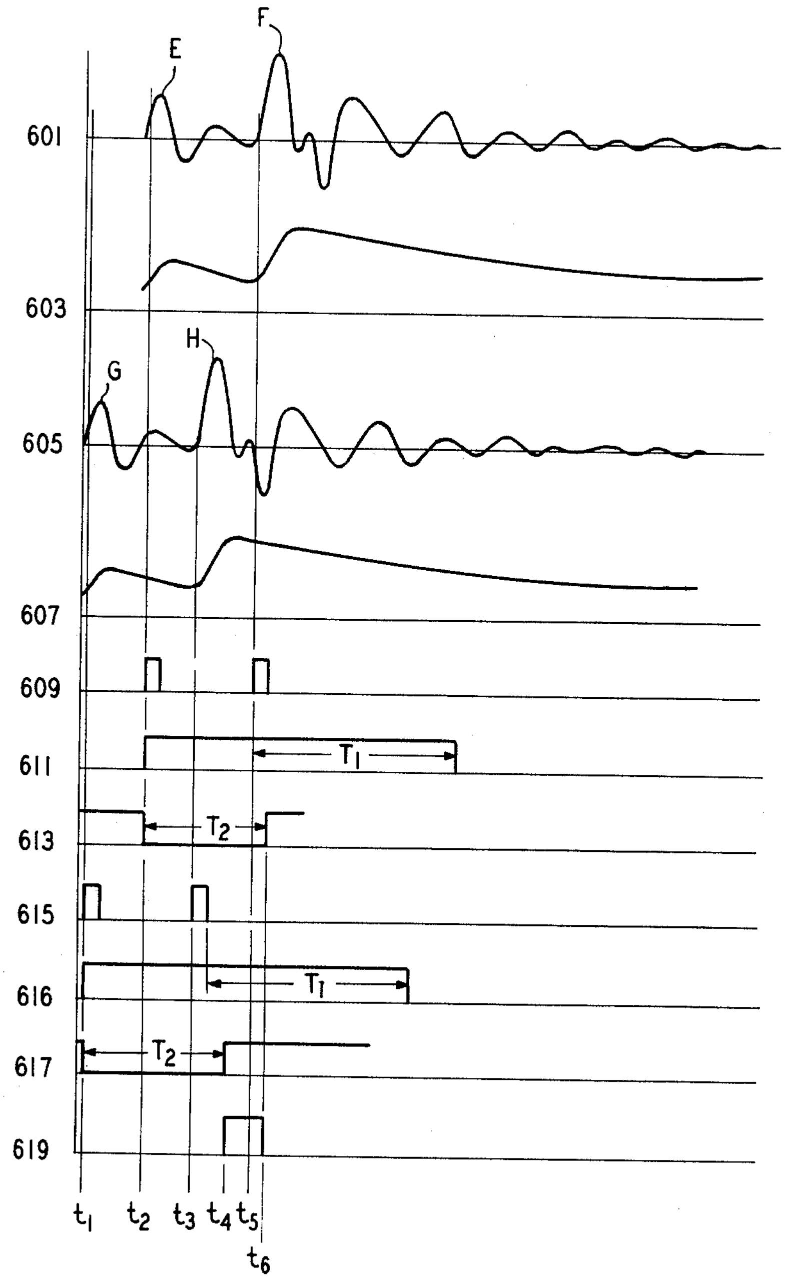
FIG. 6 shows waveforms which illustrate the operation of the signal dereverberation circuit of FIG. 2.

The input audio signal from amplifier 205 shown in waveform 601 of FIG. 6 is converted into positive envelope representative exponential waveform 603 in the circuit of FIG. 3C. Responsive to the direct path energy burst at point E in waveform 601 and the strong echo burst at point F, rectifier and detector 206 generates the direct and echo energy burst coincident pulses shown in waveform 609 at times $t_2$ and $t_5$. In similar manner, the audio signal output of amplifier 215 shown in waveform 605 is converted to the positive envelope representative exponential signal of waveform 607. Responsive to the audio signal of waveform 605 exceeding the exponential signal of waveform 607, the direct and echo energy burst coincident pulses corresponding to points G and H in waveform 605 are produced as shown in waveform 615 at times $t_1$ and $t_3$. Since microphone 213 is closer to source 200 than microphone 203, waveform 601 and waveform 609 are delayed with respect to waveforms 605 and 615.

The direct path energy burst pulse output from circuit 216 at time $t_1$ causes retriggerable delay 217 to change state whereby the output therefrom becomes high as shown in waveform 616. Delay 217 remains positive for at least a predetermined period $T_1$ and is retriggered at time $t_3$ by the pulse coincident with the point H echo burst shown in waveform 615. As is well known in the art, retriggerable delay 217 remains high for the period $T_1$ after $t_3$. The period $T_1$ is chosen to be the longest period expected betwen a direct energy burst coincident pulse and echoes thereof. The use of a retriggerable delay circuit assures that the circuit of FIG. 2 is responsive only to the direct path acoustic wave from sound source 200 and is not responsive to echoes in the audio signal.

At time $t_2$, an output pulse is obtained from rectifier and detector circuit 206 that is coincident with the energy burst at point E on waveform 601. The state of retriggerable delay 207 is changed responsive to this direct path energy burst coincident pulse whereby its output (waveform 611) becomes high. As aforementioned with respect to retriggerable delay 217, the output of delay 207 remains high for at least time period $T_1$. When retriggered by the echo energy burst coincident pulse at time $t_5$ corresponding to point F in waveform 601, the output of delay 207 remains high for a time equal to period $T_1$.

Responsive to the positive transition in the output of delay 217 (waveform 616) at time $t_1$, pulse generator 218 changes state and its output goes high. Generator 218 remains in its high state for a predetermined time $T_2$. While the output of generator 218 is high, NAND gate 219 provides a low output as shown in waveform 617. The output of NAND gate 219 is applied to the C (clock) input of flip-flop 220 and to the reset input of flip-flop 210. When the output of NAND gate 219 becomes high at time $t_4$ responsive to generator 218 changing state, flip-flop 220 is set and the one output thereof becomes high. The setting of flip-flop 210 is inhibited by the high output of gate 219.

At time $t_2$, pulse generator 208 changes state responsive to the positive transition in the output of retriggerable delay 207 (waveform 611). This positive transition corresponds to the direct path energy coincident pulse from rectifier and detector circuit 206 occurring at time $t_2$ in waveform 609. The output of pulse generator 208 is connected to the input of NAND gate 209. The output of gate 209 is low for the time period $T_2$ shown in waveform 613 while the output of generator 208 is high. The output of NAND gate 209 goes high at time $t_6$ when pulse generator 208 changes state. The postive transition at the output of gate 209, however, does not cause flip-flop 210 to be set since the reset input thereto is high at that time. But the positive voltage applied to the reset input of flip-flop 220 from the output of gate 209 at time $t_6$ causes flip-flop 220 to be reset as indicated in waveform 619. As shown in waveform 619, the one output of flip-flop 220 is high between times $t_4$ and $t_6$. This time period corresponds to the delay between the direct path energy burst coincident pulse occurring at $t_1$ responsive to the audio signal shown in waveform 605 and the direct path energy burst coincident pulse shown at $t_2$ in waveform 609 responsive to the audio signal shown in waveform 601.

The one output of flip-flop 220 is applied to the negative input of integrating amplifier 222 which, as is well known in the art, operates as a low-pass filter. Consequently, the output voltge of amplifier 222 is decreased. This decreased voltage is applied to the input of motor 224, and motor 224 is operative to rotate platform 202 counterclockwise whereby directional microphone 226 is moved in the direction of souce 200. As is well known in the art, the audio signals applied to microphones 203 and 213 consist of successions of energy bursts. The pulses from flip-flops 210 and 220 responsive to the phase difference between the audio signals from microphones 203 and 213 are utilized to adjust the direction of platform 202 so that microphone 226 and camera 228 are pointed at source 200. Microphone 226 is connected to amplifier 230 which provides dereverberated audio output. Camera 228 provides a video signal for display purposes.

In the event that source 200 moves in relation to platform 202, the phase difference between the audio signals between microphones 203 and 213 is altered. Responsive to the altered phase difference, platform 202 will rotate so that microphone 226 points toward relocated source 200. If source 200 is moved so that the audio signal from microphone 203 leads the audio signal from microphone 213, pulse generator 208 will go high prior to pulse generator 218. The positive transition in the output of gate 209 causes flip-flop 210 to be set and prevents flip-flop 220 from being set.

The later occurring positive transition at the output of gate 219 resets flip-flop 210 so that the output of integrating amplifier 222 increases. This increase of the output of integrating amplifier 222 is applied to motor 224 which rotates platform 202 in the clockwise direction. In this way, the feedback arrangement of FIG. 2 is operative to point microphone 226 in the direction of sound source 200 irrespective of the polarity of the phase difference between the audio signals from microphones 203 and 213. It is necessary to trigger both generators 208 and 209 in order to set one of flip-flops 210 and 220. Thus, no adjustment of platform 202 occurs responsive to a noise signal which triggers only one of delays 207 and 217.

While the invention has been particularly shown and described with reference to preferred embodiments thereof, it is to be understood that various changes in form and details may be made therein by those skilled in the art without departing from the spirit and scope of the invention.

What is claimed is:

1. A dereverberation circuit comprising an audio source, first and second sound detecting devices responsive to sounds from said source for producing first and second audio signals, respectively; means responsive to said first audio signal for generating a first pulse corresponding to an energy burst in said sounds; means responsive to said first pulse for inhibiting said first pulse generating means for a predetermined period following said generated first pulse; means responsive to said second audio signal for generating a second pulse corresponding to said energy burst in said sounds; means responsive to said second pulse for inhibiting said second pulse generating means for a predetermined period following said generated second pulse; and means jointly responsive to said first and second pulses for phase aligning said first and second audio signals.

2. A dereverberation circuit according to claim 1 wherein said aligning means comprises fixed delay means for delaying said first audio signal by a fixed time period; variable delay means jointly responsive to said first and second pulses for delaying said second audio signal for a period corresponding of the time difference between said first and second pulses; and further comprising means for summing said delayed first audio signal and said delayed second audio signal.

3. A dereverberation circuit according to claim 1 wherein said aligning means comprises means for maintaining said first and second sound detecting devices in fixed relation to each other; and means jointly responsive to said generated first and second pulses for orienting said maintaining means to minimize the phase difference between said first and second audio signals.

4. A dereverberation circuit according to claim 1 wherein said first pulse generating means comprises means responsive to said first audio signal for generating a first envelope representative signal having rapidly increasing portions corresponding to energy bursts in said audio sounds and relatively slow exponentially decaying portions intermediate said rapidily increasing energy burst portions; means responsive to said first audio signal exceeding said first envelope representative signal for generating a first energy burst coincident pulse; means responsive to said generated first energy coincident pulse for producing a first pulse of predetermined duration; and means responsive to said first generated energy coincident pulse for inhibiting said first pulse producing means for a predetermined period.

5. A dereverberation circuit according to claim 4 wherein said second pulse generating means comprises means responsive to said second audio signal for generating a second envelope representative signal having rapidly increasing portions corresponding to energy bursts in said audio sounds and relatively slow exponential decaying portions intermediate said rapidly increasing energy burst portions; means responsive to said second audio signal exceeding said second envelope representative signal for generating a second energy burst coincident pulse; means responsive to said generated second energy burst coincident pulse for producing a second pulse of predetermined duration; and means responsive to said generated second energy coincident pulse for inhibiting said second pulse producing means for a predetermined period.

6. A dereverberation circuit comprising first and second spatially separated electroacoustic transducers responsive to speech sounds from a common source for generating first and second speech signals respectively; means responsive to said first speech signal for producing a first envelope representative signal having rapidly increasing portions corresponding to energy bursts in said speech sounds and exponentially decaying portions corresponding to intervals between energy bursts in said speech sounds; means responsive to said first speech signal exceeding said first envelope representative signal for generating first pulses corresponding to energy bursts in said speech sounds; means for selecting a first pulse occurring after a predetermined time following the immediately preceding first pulse; means responsive to said second speech signal for producing a second envelope representative signal having rapidly increasing portions corresponding to energy bursts in said speech sounds and exponentially decaying portions corresponding to intervals between energy bursts in said speech sounds; means responsive to said second speech signal exceeding said second envelope representative signal for generating second pulses corresponding to energy bursts in said speech sounds; means for selecting a second pulse occurring after a predetermined time following the immediately preceding second pulse; and means jointly responsive to said selected first and second pulses corresponding to a speech sound energy burst for phase-aligning said first and second speech signal.

7. A dereverberation circuit according to claim 6 wherein said phase-aligning means comprises means jointly responsive to said selected first and second pulses for generating a signal representative of the time difference between said first and second pulses; fixed delay means for delaying said first speech signal; variable delay means for delaying said second speech signal for a time corresponding to said time difference signal; and further comprises means for summing said delayed first signal and said delayed second signal.

8. A dereverberation circuit according to claim 7 wherein said time difference signal generating means comprises means responsive to said selected first pulse for generating a third pulse of predetermined duration; means responsive to the termination of said third pulse for generating a fourth pulse of predetermined duration; means responsive to said selected second pulse for generating a fifth pulse of said predetermined duration; means responsive to the termination of said fifth pulse for generating a sixth pulse of said predetermined duration; means jointly responsive to said third and sixth pulses for generating a signal corresponding to the time overlap of said third and sixth pulses; and means jointly responsive to said fourth and fifth pulses for generating a signal corresponding to the time overlap of said fourth and fifth pulses.

9. A dereverberation circuit according to claim 7 wherein said time difference signal generating means comprises means responsive to said selected first pulse for generating a third pulse of predetermined duration; means responsive to said selected second pulse for generating a fourth pulse of said predetermined duration; and means jointly responsive to said third and fourth pulses for generating a signal corresponding to the time difference between the termination of said third pulse and the termination of said fourth pulse.

10. A dereverberation circuit according to claim 6 wherein said phase-aligning means comprises means for mounting said first and second transducers in fixed relation to each other; means jointly responsive to said first and second pulses for generating a signal representative of the time difference between said first and second pulses; and means responsive to said time difference signal for rotating said mounting means to minimize said time difference signal.

11. A dereverberation circuit according to claim 10 further comprising video pick-up means affixed to said mounting means.

12. A dereverberation circuit according to claim 10 wherein said time difference signal generating means comprises means responsive to said selected first pulse for generating a third pulse of predetermined duration; means responsive to the termination of said third pulse for generating a fourth pulse of predetermined duration; means responsive to said selected second pulse for generating a fifth pulse of said predetermined duration; means responsive to the termination of said fifth pulse for generating a sixth pulse of said predetermined duration; means jointly responsive to said third and sixth pulses for generating a signal corresponding to the time overlap of said third and sixth pulses; and means jointly responsive to said fourth and fifth pulses for generating a signal corresponding to the time overlap of said fourth and fifth pulses.

13. A dereverberation circuit according to claim 10 wherein said time difference signal generating means comprises means responsive to said selected first pulse for generating a third pulse of predetermined duration; means responsive to said selected second pulse for generating a fourth pulse of said predetermined duration; and means jointly responsive to said third and fourth pulses for generating a signal corresponding to the time difference between the termination of said third pulse and the termination of said fourth pulse.

14. A dereverberation circuit according to claim 6 wherein said first electroacoustic transducer comprises a plurality of microphones arranged in a first vertical column, and means for summing the speech signals from said first vertical column microphones to form said first speech signal; and said second electroacoustic transducer comprises a plurality of microphones arranged in a second vertical column a predetermined distance from said first vertical column and means for summing the speech signals from said second vertical column microphones to form said second speech signal.

15. A speech dereverberation system comprising at least first, second and third spatially separated sound transducing means each responsive to speech sounds from a common source for generating a speech signal, said second transducer means being between said first and third transducer means; means responsive to said first transducing means speech signal for generating a first pulse corresponding to each energy burst in said speech sound; means for selecting a first pulse occurring after the absence of first pulses for a predetermined time; means responsive to said second transducing means speech signal for generating a second pulse corresponding to each energy burst in said speech sound; means for selecting a second pulse occurring after the absence of second pulses for a predetermined time; means responsive to said third transducing means speech signal for generating a third pulse corresponding to each energy burst in said speech sound; means for selecting a third pulse occurring after the absence of third pulses for a predetermined time; first means jointly responsive to said selected first and second pulses for phase aligning said first and second transducing means speech signals; second means jointly responsive to said selected second and third pulses for phase aligning said second and third transducing means speech signals; and means for summing said phase aligned first and second transducing means speech signals, said phase aligned second and third transducing means speech signals, and said second transducing means speech signal.

16. A speech dereverberation system according to claim 15 wherein each of said first, second and third pulse generating means comprises means for generating a speech envelope signal having a rapidly increasing portion corresponding to said energy burst and a slowly decaying exponential portion after said energy burst; and means jointly responsive to said transducing means speech signal and said speech envelope signal for generating a pulse corresponding to said speech signal exceeding said speech envelope signal.

17. A speech dereverberation system according to claim 16 wherein said first phase aligning means comprises means for delaying said second transducing means speech signal for a fixed period, means for delaying said first transducing means speech signal for a period corresponding to the time difference between said selected first and second pulses, and means for summing said delayed first transducing means speech signal and said delayed second transducing means speech signal; and said second phase aligning means comprises means for delaying said second transducing means speech signal for a fixed period; means for delaying said third transducing means speech signal for a period corresponding to the time difference between said selected second and third pulses; and means for summing said delayed second transducing means speech signal and said delayed third transducing means speech signal.

18. A speech dereverberation system according to claim 15 wherein each of said transducing means comprises a plurality of microphones arranged in a vertical column, and means for summing the outputs of said vertical column microphones to form said transducing means speech signal.

19. A circuit for orienting a platform with respect to a sound source comprising means for mounting first and second transducers in fixed relation to each other on a platform, said transducers being responsive to acoustic waves from said sound source to produce first and second audio signals respectively; means responsive to said first audio signal for generating a first pulse corresponding to each energy burst from said sound source; means for selecting a first pulse occurring after the absence of first pulses for a predetermined time; means responsive to said second audio signal for producing a second pulse corresponding to each energy burst from said sound source; means for selecting a second pulse occurring after the absence of second pulses for a predetermined time; means responsive to said selected first and second pulses for generating a signal respresentative of the time difference between said selected first and second pulses; and means responsive to said time difference representative signal for rotating said platform whereby said time difference representative signal is minimized.

20. A circuit for orienting a device with respect to a sound source comprising means for affixing first and second electroacoustic transducers and said device in a predetermined relationship to a rotatable platform, said first and second transducers being responsive to a sound from said sound source to produce first and second audio signals respectively; means responsive to said first audio signal for generating a first pulse corresponding to each energy burst from said source; means for selecting a first pulse following the absence of first pulses for a predetermined time; means responsive to said second audio signal for generating a second pulse corresponding to each energy burst from said source; means for selecting a second pulse following the absence of second pulses for said predetermined time; means jointly responsive to said selected first and second pulses for generating a signal representative of the time difference between said selected first and second pulses; and means responsive to said time difference representative signal for rotating said platform to minimize said time difference representative signal whereby said device assumes a predetermined orientation with respect to said sound source.

21. A circuit for orienting a device with respect to a sound source according to claim 20 wherein said device comprises a unidirectional microphone and said platform is oriented so that said unidirectional microphone points to said sound source.

22. A circuit for orienting a device with respect to a sound source according to claim 20 wherein said device comprises video pick-up means and said platform is oriented to point said video pick-up means to said sound source.

* * * * *